United States Patent [19]

Adams

[11] Patent Number: 6,055,568

[45] Date of Patent: Apr. 25, 2000

[54] METHOD AND APPARATUS FOR DYNAMICALLY CONFIGURING A DECENTRALIZED NETWORK OF COMPUTERS

[75] Inventor: Robert Adams, Lake Oswego, Oreg.

[73] Assignee: Intel Corporation, Santa Clara, Calif.

[21] Appl. No.: 08/768,783

[22] Filed: Dec. 17, 1996

[51] Int. Cl.[7] .......................... G06F 13/00; G06F 13/368; G06F 15/00; G06F 15/163

[52] U.S. Cl. .......................... 709/221; 709/220; 709/231; 709/225; 709/250

[58] Field of Search ........................ 395/220.56, 200.31, 395/200.73, 200.79, 200.51, 200.53, 200.52, 200.8; 709/226, 201, 243, 245, 221, 223, 222, 250

[56] References Cited

U.S. PATENT DOCUMENTS

| | | | |
|---|---|---|---|
| 4,604,693 | 8/1986 | Chadima et al. | 395/200.51 |
| 5,031,089 | 7/1991 | Liu et al. | 395/200.56 |
| 5,099,235 | 3/1992 | Crookshanks | 395/200.73 |
| 5,495,426 | 2/1996 | Waclawsky et al. | 395/200.56 |

*Primary Examiner*—Frank J. Asta
*Assistant Examiner*—Ivan C. Pierce, III
*Attorney, Agent, or Firm*—Blakely, Sokoloff, Taylor & Zafman LLP

[57] ABSTRACT

A method and apparatus for dynamically re-configuring network interconnections to achieve a more efficient utilization of the network's resources in light of the current intercommunication traffic. In one embodiment of the invention, a first computer system selects and disconnects a first decentralized direct network connection between the first computer system and a second computer system. The first connection is selected from a plurality of connections between the first computer system and a plurality of computer systems, and the first connection is selected based on a predetermined criterion. In addition, the first computer system selects and establishes a second decentralized direct network connection between the first computer system and a third computer systems, in place of the disconnected first decentralized direct network connection.

15 Claims, 4 Drawing Sheets

Network Configuration

METHOD AND APPARATUS FOR DYNAMICALLY CONFIGURING A DECENTRALIZED NETWORK OF COMPUTERS

FIELD OF THE INVENTION

The present invention relates to the networking of computer systems, and, in particular, the dynamic configuration of a decentralized network of computer systems.

BACKGROUND OF THE INVENTION

Several different computer network techniques are available to transmit information throughout a group of interconnected computer systems. One technique uses a central computer, which has a network connection to all the computer systems included in the network. When using the central computer technique, computer systems will transmit information between each other via the central computer. For example, a first computer will send a message to a second computer by first sending the message to the central computer, which then forwards the message to the second computer system.

Other networking techniques that do not use a central computer are commonly known as "decentralized" computer networks. Decentralized computer networks transmit information between computers "directly" without using a central computer as an intermediary. In decentralized networks, computer systems commonly transmit data using flooding algorithms, wherein a stream of data is sent throughout the network without need for appending a destination address to the stream of data.

The direct connections of a decentralized network are typically pre-established prior to the transmission of information. However, the pre-established configuration of the computer interconnections may not be an efficient configuration. For example, a first computer system may be interconnected with a second computer system via a first direct connection which has a relatively high latency. A third computer system, however, may be able to provide a faster interconnection to the first computer system, in place of the connection between the first and second computer system.

In addition, sometimes a particular computer system connected to a network may have a relatively heavy work load. For example, a computer may have a relatively high number of interconnections with other computer systems. Therefore, that particular computer system has the cumbersome task of forwarding data to several interconnections. As a result, the heavy work load may be causing bottle neck like delay at the computer system. This could be reduced by having the computer system with the heavy work load drop some of its interconnections.

However, conventional computer systems in a decentralized network are unable to "dynamically" (i.e., without user interaction) re-configure a set of interconnections to provide more efficient configuration of computer interconnections.

Therefore, it can be appreciated, that there is a need for having computer systems in a decentralized network, dynamically detect an inefficient topology and re-configure the computer interconnections into a more efficient configuration of computer interconnections.

SUMMARY OF THE INVENTION

The present invention provides a method and apparatus for dynamically re-configuring network interconnections to achieve a more efficient utilization of the network's resources in light of the current intercommunication traffic. In one embodiment of the invention, a first computer system selects and disconnects a first decentralized direct network connection between the first computer system and a second computer system. The first connection is selected from a plurality of connections between the first computer system and a plurality of computer systems, and the first connection is selected based on a predetermined criterion.

In addition, the first computer system selects and establishes a second decentralized direct network connection between the first computer system and a third computer systems, in place of the disconnected first decentralized direct network connection.

BRIEF DESCRIPTION OF THE DRAWINGS

The present invention is illustrated by way of example and not limitation in the figures of the accompanying drawings, and in which.

DETAILED DESCRIPTION

The present invention provides a method and apparatus for dynamically re-configuring direct connections between computer systems in a decentralized network of computer systems to provide a more efficient network configuration.

Figure 1:
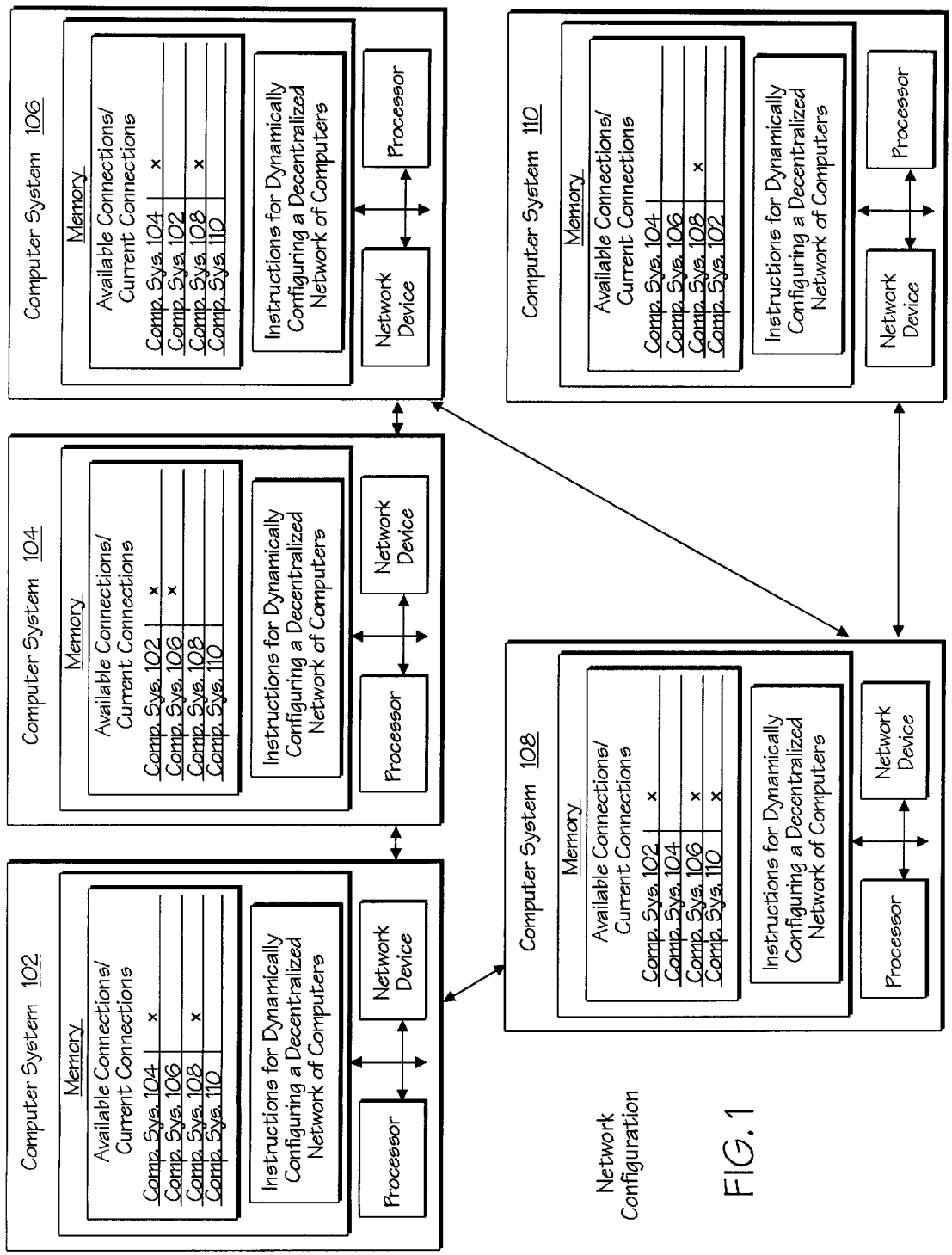
FIG. 1 illustrates a decentralized network configuration of a several exemplary computer systems implementing one embodiment of the present invention.

FIG. 1 illustrates a decentralized network configuration of a several exemplary computer systems implementing one embodiment of the present invention. The network configuration shown in FIG. 1 is "decentralized" because there is no central computer system included in the network that determines which computer systems in the network will receive a particular stream of data. The computer systems shown in FIG. 1 communicate in what is commonly known as a "Peer to Peer" relationship, wherein the computer system directly communicate to each other on the same communication level.

Streams of data are transmitted throughout the network based on the current logical interconnections of the computer systems, which are pre-established prior to data being transmitted. Data is sent to be received by all interconnected computers. For example, as shown in FIG. 1, if computer system 102 generates a stream of data to be sent to the other computers in the network, the data will first be transmitted from system 102 to system 104 and system 108. Computer system 108, in turn, will forward the data to computer system 106 and system 110.

In one embodiment of the present invention, the computer systems provided in the decentralized network configuration are able "dynamically" re-configure their interconnections with the other computer systems to interconnect the computers in a more efficient configuration, when and as needed. For example, computer system 108 may replace its direct connection to computer system 102 with a direct connection to computer system 104, and/or drop its direct connection with computer system 106 or computer system 110.

In one embodiment of the present invention, the dynamic reconfiguration of the network interconnections is performed by the "Instructions For Dynamically Configuring A Decentralized Network of Computers", as shown in the memory of the computer systems of FIG. 1. In alternative embodiments, the instructions may be provided in alternative memory devices. Furthermore, the instructions may be implemented in circuitry.

A computer system of the present invention may re-configure its respective interconnections if and when it determines that particular connection with another computer has too high of a latency, or if the respective computer's work load is too high. That is, a computer's work load may be causing a delay before the computer is able to forward messages to other computers.

In one embodiment, when a computer system of the present invention receives a stream of data through an interconnection, it will measure the latency of the interconnection and also measures it's current work load. The computer system will then compare the two measurements to a predetermined criterion, discussed in more detail below, to determine whether a direct interconnection should be replaced or disconnected.

In one embodiment, as illustrated in FIG. 1, the computer systems of the present invention may use a table having the Available Connections and Current Active Connections to assist in replacing or disconnecting interconnections. More specifically, as shown in the memory of the computer systems in FIG. 1, the table would list all the available connections, and further indicate which connections are currently active (shown in FIG. 1 by an 'X' in the respective Current Connections column). As a result, the computer systems could read their respective tables to determine which connections are available for possible replacement. In an alternative embodiment, the table may further indicate priority among the current interconnection, to assist in selecting which interconnection is to be dropped or replaced.

Prior to disconnecting an interconnection, however, a computer system will first establish a new connection with a different computer system, or alternatively verify that one of its existing interconnections will provide the computer system with the data in place of the interconnection to be disconnected.

As a result, by having the computer systems of the present invention continuously re-configure their respective interconnections, the overall network configuration will continue to progress towards a more efficient utilization of the network's resources in light of the current intercommunication traffic.

Figure 2:
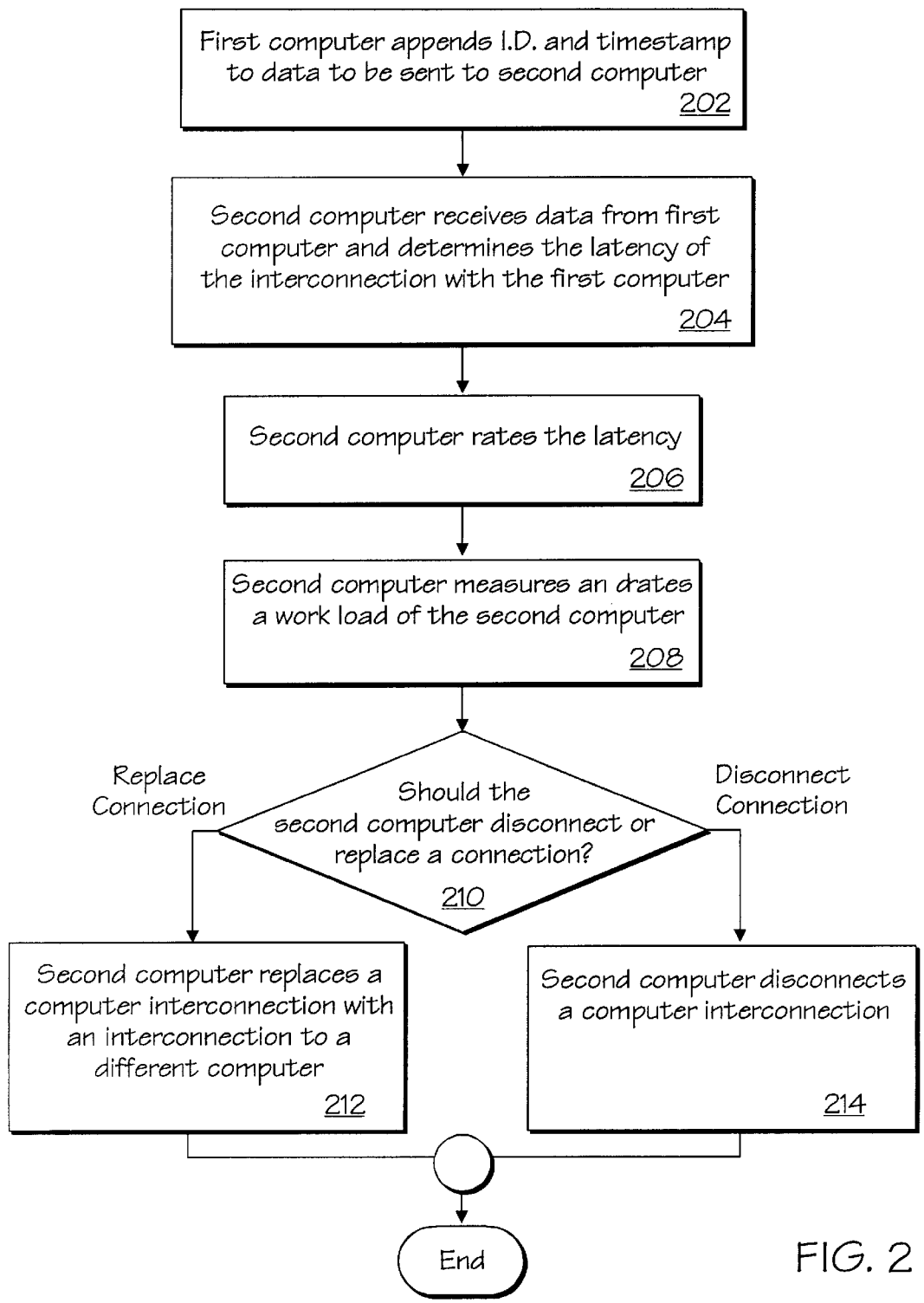
FIG. 2 illustrates a flow diagram describing the steps of dynamically re-configuring a decentralized network of computer systems according to one embodiment of the present invention.

Referring to FIG. 2, a flow diagram is illustrated, which further describes the steps of dynamically re-configuring a decentralized network of computer systems according to one embodiment of the present invention. In step 202, a first computer system prepares a stream of data to be sent to a second computer system via a direct logical interconnection between the two computers. The first computer system prepares the stream of data by appending a message to the steam of data, which will be used by the second computer system to determine the current latency of the interconnection between the two the computer systems. In one embodiment of the present invention, the message includes an identification of the first computer system and the time of when the data was sent from the first computer system to the second computer system.

In step 204, the second computer system receives the stream of data from the first computer system and determines the current latency of the interconnection between the first computer system and the second computer system. In one embodiment of the present invention, the current latency is measured by the second computer system comparing when the data was sent by the first computer system to when the data was received by the second computer system.

In an alternative embodiment, the second computer system will generate a response to the first computer system. The response may indicate when the second computer system received the data from the first computer system and when the response was returned to the first computer system. The first computer will then be able to determine the current latency of the interconnection by calculating the time that elapsed between sending the data to the second computer and receiving a response, minus the time it took the second computer to generate its response. The results could then be divided by two to generate the current latency for the interconnection between the two computer system. Implementation of the alternative embodiment provides the advantage of not having to synchronize the two computer systems.

Once the latency is calculated, in step 206, the latency is rated against a predetermined scale. In one embodiment of the present invention, the latency is rated as low, medium, or high.

In step 208, the current work load of the second computer system is measured and rated. The work load may be measured by determining how many other computer systems are interconnected to the second computer systems. That is, if the number of active interconnections for the second computer system is high the work load may be considered high. As well, if the number of interconnections for the second computer system is low, the work load of the second computer system may be considered low, which may indicate the respective computer system is able to receive additional interconnections. The number of messages being received and relayed by a computer system can also be considered when determining the level of the work load.

In alternative embodiments, the work load may further be measured by measuring the current work load of the computer systems' Central Processing Unit ("CPU"). The CPU's work load could be measured by reading the CPU's work queue, or alternatively determining what application is presently being processed by the CPU. Other properties may be analyzed in measuring the computer system's current work load with out departing from the scope of the invention.

Once the work load of the second computer system is measured, the work load is rated against a predetermined scale. In one embodiment, the work load is rated as low, medium, or high.

In step 210, the second computer system compares the current latency and the current work load status to a predetermined criterion to determine whether the second computer system needs to replace or disconnect one of its direct interconnections. In one embodiment, the predetermined criterion used to determine whether and how to re-configure the computer systems interconnections is shown below in Table 1.

In Table 1, "Replace" indicates an interconnection with a particular computer system is to be replaced with a new interconnection to another computer system, in an attempt to find an interconnection with a relatively lower latency. "Drop" indicates an interconnection should be disconnected, in an attempt to decrease a computer systems work load.

TABLE 1

| Work Load | Latency | | |
| --- | --- | --- | --- |
| | Low | Medium | High |
| Low | — | Replace | Replace |
| Medium | Drop | — | Replace |
| High | Drop | Drop | — |

For example, using the criterion shown in Table 1, if the current work load is rated to be low and the current latency is rated to be medium or high, the second computer system will replace the direct logical interconnection to the first computer system with a direct logical connection to another computer system. However, if the load is rated high and the latency is rated low or medium, then the second computer will drop at least one direct logical connection between the first computer system and another computer system to lessen its current work load. If the load is rated to be low and the latency is measured to be low, no disconnections or replacements are necessary.

In alternative embodiments of the present invention, the actual criterion used to determine whether a computer system is to replace or disconnect an interconnection can vary within the scope of the invention. For example, the criterion may only include the latency of interconnections, or it may only include the work load of the computer system. Alternatively, the criterion may include additional properties to be considered in conjunction with, or in place of, the latency of an interconnection or work load of a computer system.

Based on the predetermined criterion, if the second computer system determines that it should replace its interconnection with the first computer system, in step 212 the second computer system will initiate establishing an interconnection with a new computer system selected from the network of computer systems, before it disconnects an existing connection. In one embodiment, the second computer will send a request to a computer system selected within the network, asking whether the selected computer is able to provide an interconnection with the second computer system. The message sent to the selected computer system may further include additional information on the "type" of connection.

If the selected computer system indicates that it is able to provide an interconnection with the second computer system, then the second computer system and the selected computer system proceed to establish the interconnections. After the interconnection is established, the second computer system will proceed to disconnect the interconnection between the first and second computer systems.

Figure 3:
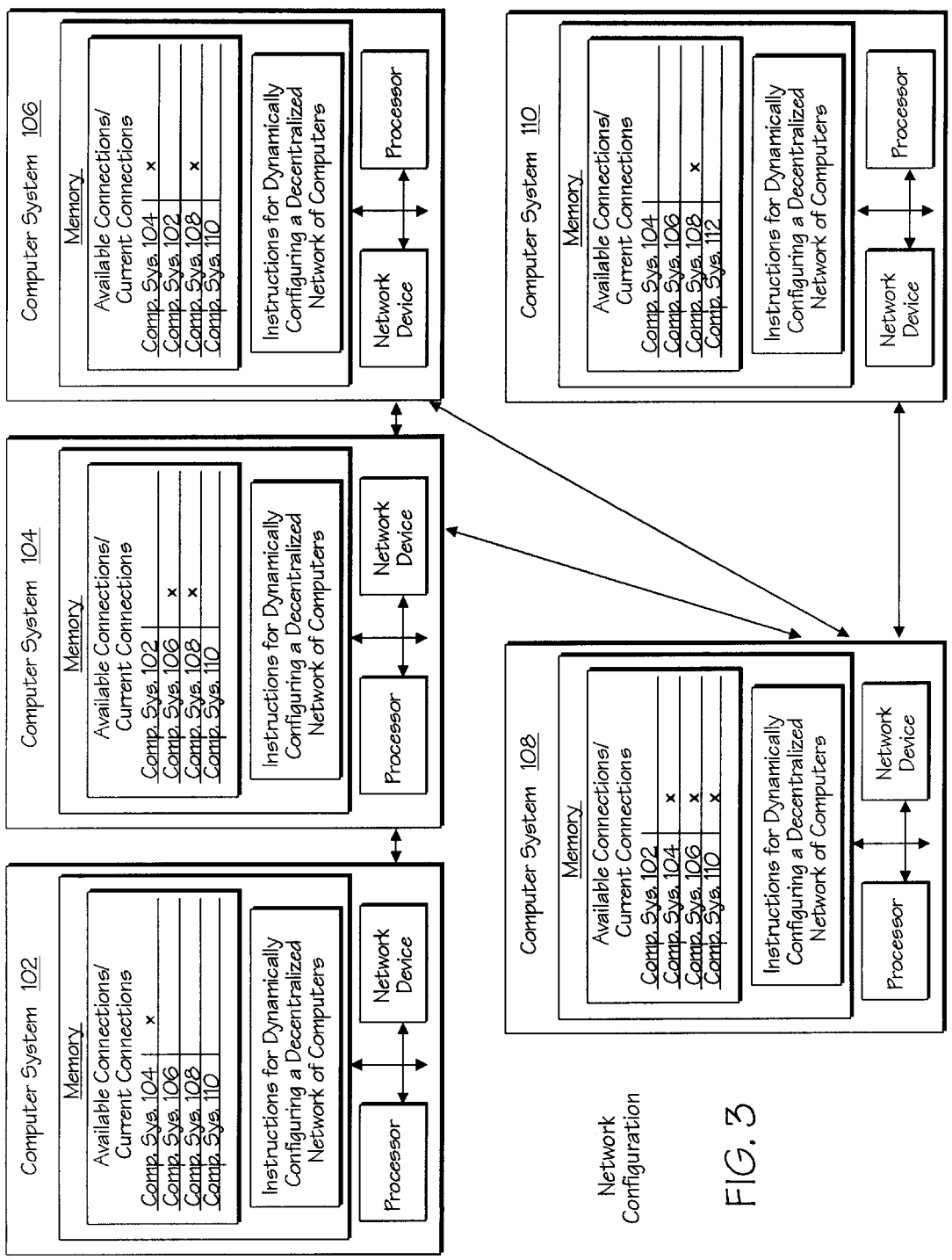
FIG. 3 illustrates a decentralized network configuration of a several exemplary computer systems implementing one embodiment of the present invention.

As an example, consider FIG. 1 which shows computer system 102 interconnected with computer system 108. Assume computer system 108 determines the interconnection between computer system 108 and computer system 102 has too high of a latency and chooses to replace the interconnection. Computer system 108 could read its table provided in memory and see that it could replace the interconnection to a new interconnection with computer system 104. As a result, computer system 108 could proceed to drop the interconnection with computer system 102 and replace it with a interconnection to computer system 104, as shown in FIG. 3.

In the case where a selected computer system is unable to provide an interconnection with the second computer system, the second computer system will continue searching for a computer system within the network configuration that is able to provide an interconnection with the second computer system. In one embodiment of the present invention, the second computer system may have a table of all the computer systems available in the network configuration, such as the one shown in computer system 108 of FIG. 1. The second computer system may use the table to select a computer system to replace the interconnection with the first computer system. In one embodiment, the table may list all the computers within the network and further indicate those which presently have an current connection with the second computer system.

On the other hand, if the second computer system determines that it needs to drop a connection to lessen its work load, in step 214 the second computer system will proceed to disconnect at least one interconnection. In one embodiment of the present invention, the second computer system disconnects an interconnection by sending a warning message to the computer system at the other end of the interconnection that is to be disconnected. Once the computer system at the other end of the interconnection responds and indicates that the connection may be disconnected, the second computer system will proceed to disconnect the interconnection.

Figure 4:
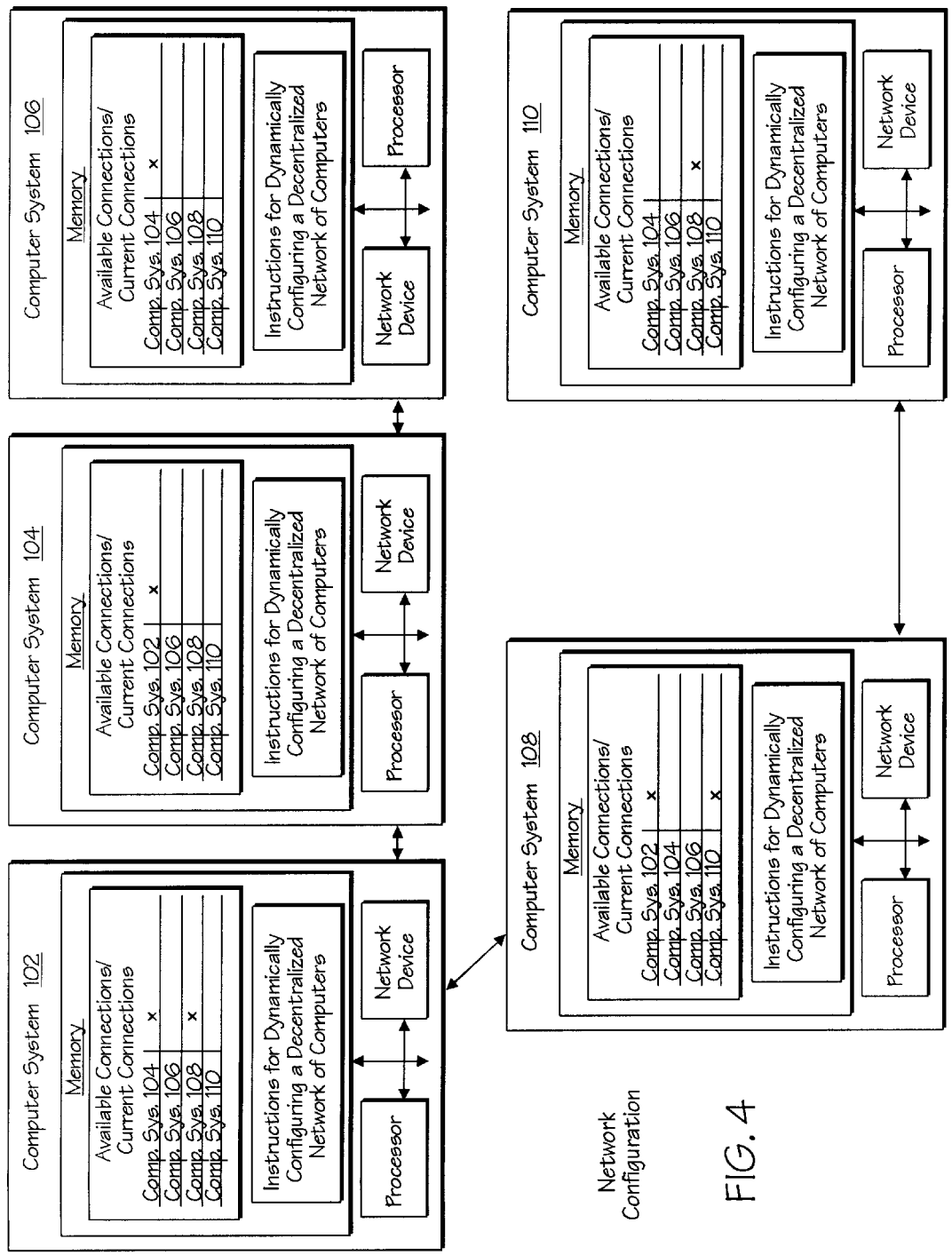
FIG. 4 illustrates a decentralized network configuration of a several exemplary computer systems implementing one embodiment of the present invention.

As an example, once again consider FIG. 1 which shows computer system 108 interconnected with computer system 106. Assume computer system 108 determines the its work load is too much. As a result, as shown in FIG. 4, computer system 108 could disconnect its interconnection with computer system 106. Therefore, computer system 108 would have one less interconnection on its work load, and computer system 106 would remain interconnected with the network via computer system 104, as also shown in FIG. 4.

If the computer system at the other end of the interconnection indicates that the connection may not be disconnected, the second computer system may attempt to disconnect another interconnection until it is successful.

When selecting an interconnection that is to be dropped, the computer systems of the present invention may again be able to use the same table that is used to search for a replacement interconnection.

In one embodiment, each computer system implemented with the present invention, may dynamically perform the steps of the present invention, as described above, each time a computer system receives a stream of data from another computer system. Alternatively, the steps of the present invention may be performed intermittently beset on a predetermined time period.

In an alternative embodiment, the present invention helps minimize redundant transmission of data. That is, each computer system included in the network configuration has a unique identifier. As a stream of data is passed throughout the network, each computer system appends its unique identifier to the stream of data.

Therefore, when a computer system receives a stream of data it reads the unique identifiers attached to the stream of data. If the unique identifier for that computer system is attached to the stream of data, then that computer system has already received that stream of data. In that case, the computer system will discard the stream of data to minimize redundant transmission of the data.

The steps of the present invention, as described above, may be implemented as a computer program product which may include a computer readable medium having stored thereon instructions which can be used to program a computer system to dynamically connect or disconnect logical network connections. The computer readable medium can include, but is not limited to, floppy disks, optical disks, CD-ROMs, and magneto-optical disks, ROMs, RAMs, EPROMs, EEPROMs, magnet or optical cards, or other media suitable for storing electronic instructions.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A computer-implemented method for dynamically reconfiguring network interconnections, said method comprising:

dynamically selecting a first decentralized direct network connection between a first computer system and a second computer system, said first connection selected from a plurality of connections between said first computer system and a plurality of computer systems, and said first connection selected based on a predetermined criterion; and dynamically disconnecting a second decentralized direct network connection between said first computer system and a third computer system in response to selecting said first network connection;

dynamically determining whether a first stream of data has previously been transmitted to said first computer system; and discarding said first stream of data in response to determining said first stream of data has been previously been transmitted to said first computer system.

2. The computer-implemented method of claim 1, further including the step of:

dynamically establishing a third decentralized direct network connection between said first computer system and a fourth computer systems.

3. The computer-implemented method of claim 1, wherein said predetermined criterion includes a latency of transferring data between at least one of said plurality of computer systems and the first computer system.

4. The computer-implemented method of claim 3, further including the step of:

determining a latency of transmitting data to said first computer system by reading a message appended to data received by said first computer system from one of said plurality of computers systems.

5. The computer-implemented method of claim 4, wherein said predetermined criterion includes a logical combination of a work load of said first computer system and said latency of transferring data to said first computer system.

6. A computer-readable medium having stored thereon a first set of instructions for dynamically re-configuring network interconnections, said first set of instructions, when executed by a processor, cause said processor to perform a method comprising of:

dynamically selecting a first decentralized direct network connection between a first computer system and a second computer system, said first connection selected from a plurality of connections between said first computer system and a plurality of computer systems, and said first connection selected based on a predetermined criterion;

dynamically disconnecting a second decentralized direct network connection between said first computer system and a third computer system in response to selecting said first network connection;

dynamically determining whether a stream of data has previously been transmitted to said first computer system; and discarding said first stream of data in response to determining said first stream of data has been previously been transmitted to said first computer system.

7. The computer-readable medium of claim 6, wherein said first set of instructions includes additional instructions, which when executed by said processor, cause said processor to perform the additional step of:

dynamically establishing a third decentralized direct network connection between said first computer system and a fourth computer systems.

8. The computer-readable medium of claim 6, wherein said predetermined criterion includes a latency of transferring data between at least one of said plurality of computer systems and the first computer system.

9. The computer-readable medium of claim 8, wherein said first set of instructions includes additional instructions, which when executed by said processor, cause said processor to perform the additional step of:

determining a latency of transmitting data to said first computer system by reading a message appended to data received by said first computer system from one of said plurality of computers systems.

10. The computer-readable medium of claim 9, wherein said predetermined criterion includes a logical combination of a work load of said first computer system and said latency of transferring data to said first computer system.

11. A first computer system comprising:

a first device configured to dynamically select and disconnect a first decentralized direct network connection between said first computer system and a second computer system, said first connection selected from a plurality of connections between said first computer system and a plurality of computer systems, said first connection selected based on a predetermined criterion; and said first device is further configured to dynamically identify whether a stream of data has previously been transmitted to said first computer system, and discard said first stream of data in response to identifying said first stream of data having been previously been transmitted to said first computer system.

12. The computer system of claim 11, wherein said first device is further configured to establish a second decentralized direct network connection between said first computer system and a third computer systems in place of said first connection.

13. The computer system of claim 11, wherein said predetermined criterion includes a latency of transferring data between at least one of said plurality of computer systems and the first computer system.

14. The computer system of claim 13, wherein said first device is further configured to read a message appended to data received by said first computer system from one of said plurality of computers systems, said first device being configured to read said message to determine a latency of transmitting said data.

15. The computer system of claim 14, wherein said predetermined criterion includes a logical combination of a work load of said first computer system and said latency of transferring data between said at least one of said plurality of computer systems and the first computer system.

* * * * *